United States Patent
Leong et al.

(10) Patent No.: US 7,365,510 B1
(45) Date of Patent: *Apr. 29, 2008

(54) MOTOR SPINDLE CONTROL SYSTEM AND METHOD

(75) Inventors: Foo Leng Leong, Singapore (SG); Chen Yong Teoh, Singapore (SG); Siew Yong Chui, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,513

(22) Filed: Mar. 23, 2007

Related U.S. Application Data

(63) Continuation of application No. 11/482,560, filed on Jul. 7, 2006, now Pat. No. 7,205,744, which is a continuation of application No. 11/104,683, filed on Apr. 12, 2005, now Pat. No. 7,098,621.

(60) Provisional application No. 60/638,780, filed on Dec. 23, 2004.

(51) Int. Cl.
*G05B 23/02* (2006.01)

(52) U.S. Cl. ............ 318/568.24; 318/560; 318/566; 318/567; 318/138; 318/254; 318/439

(58) Field of Classification Search .......... 318/138, 318/254, 439, 700, 560–568.24
See application file for complete search history.

(56) References Cited

U.S. PATENT DOCUMENTS

| | | | |
|---|---|---|---|
| 5,208,518 A | 5/1993 | Grapenthin et al. | |
| 5,254,914 A | 10/1993 | Dunfield et al. | |
| 5,990,643 A | 11/1999 | Holling et al. | |
| 6,218,794 B1 | 4/2001 | Shimizu et al. | |
| 6,462,491 B1 * | 10/2002 | Iijima et al. ............ | 318/254 |
| 2003/0234623 A1 | 12/2003 | Douglas | |

* cited by examiner

*Primary Examiner*—Lincoln Donovan
*Assistant Examiner*—Renata McCloud

(57) ABSTRACT

In a method for measuring motor speed and position by detecting the back EMF generated during pole-pair interactions, a separate respective duration of a power phase suppression signal, that is set during back EMF detection, is stored in memory for each respective pole. The separate respective duration values are determined during a calibration phase by iteratively lengthening each respective duration one unit at a time (up to a maximum value) until no part of the respective back EMF signal occurs outside the suppression signal duration, and those values are stored. During operation, the approach of a pole-pair interaction may be determined from the electrical cycle of the power supply, and then the stored duration value is used to control the state of the suppression signal.

45 Claims, 5 Drawing Sheets

MOTOR SPINDLE CONTROL SYSTEM AND METHOD

CROSS REFERENCE TO RELATED APPLICATIONS

This is a continuation of commonly-assigned U.S. patent application Ser. No. 11/482,560, filed Jul. 7, 2006, now U.S. Pat. No. 7,205,744, which is a continuation of commonly-assigned application Ser. No. 11/104,683, filed Apr. 12, 2005, now U.S. Pat. No. 7,098,621, which claims the benefit of U.S. Provisional Patent Application No. 60/638,780, filed Dec. 23, 2004.

BACKGROUND OF THE INVENTION

This invention relates to a system and method for controlling the spindle of an electric motor, and more particularly to a system and method for controlling the spindle of a motor that rotates the platter of a disk drive.

Controlling the speed at which the platter of a disk drive rotates is very important, particularly as storage densities increase and platter size decreases. Thus, in a microdrive—i.e., a drive having a platter diameter of about 1 inch or less—even a small error in angular position resulting from an error in speed control may result in an incorrect sector being read or written. It is therefore a nominal goal to determine disk speed to within 0.01%.

Position, and therefore speed, of a disk drive platter is commonly determined by detecting the back electromagnetic field (back EMF) generated when one of the motor poles passes one of the stator poles. For example, it is typical for a disk drive motor to have six poles, so that each pole-pair interaction theoretically signifies 60° of motor rotation. However, in practice, it is difficult during manufacturing to accurately position the poles. Therefore, in practice, some sets of adjacent poles may be closer together than 60°, and other sets of adjacent poles may be further apart than 60°. These offsets may be slight, but may be enough to prevent achieving the desired 0.01% accuracy.

It therefore would be desirable to be able to more accurately control the speed of a motor, particularly in a disk drive, notwithstanding inaccurate pole placement.

SUMMARY OF THE INVENTION

The actual pole positions for a given motor can be measured after manufacture and stored in a memory accessible to the motor controller. As the motor controller detects the back EMF generated by each pole-pair interaction, it can take into account the actual position of each pole, rather than assuming that the poles are precisely uniformly spaced around the rotor.

In order for the back EMF generated by each pole-pair interaction to be accurately detected, one phase of the multiphase supply voltage preferably is suppressed during back EMF measurements. In the ideal case (when the poles are perfectly uniformly spaced apart), each pole position coincides precisely with one electrical cycle of the supply voltage. Therefore, the completion of one electrical cycle and the beginning of a new electrical cycle is used as a trigger for the control signal that suppresses the one phase. However, because the poles may not be perfectly positioned, the back EMF may occur at least partly outside the interval during which the suppression signal is set to a first state to cause suppression of the one phase, which could adversely affect position and speed determinations based on the back EMF measurement.

To compensate, in accordance with the present invention, the duration of the suppression signal may be adjusted separately for each pole. A value representing the duration of the suppression signal for each pole may be stored in a memory accessible to the motor controller. Each value would start out at a default value, which preferably represents a minimum duration. A signal mark preferably is provided on one pole to serve as a position reference. The motor controller can identify a particular pole by counting the number of poles since the most recent detection of the signal mark. As each pole approaches, the motor controller can read the required suppression signal duration from the memory and apply the suppression signal accordingly.

The duration values typically need to be determined only once, by calibrating the motor at the time of manufacture. Calibration may be accomplished by setting each suppression duration to the minimum value, activating the motor, detecting each occurrence of back EMF, and for each occurrence detected, determining whether or not the detected back EMF occurred fully within the suppression interval. If it did not, the value of the suppression interval for that pole only is increased to the next longer value. Preferably the values are stored digitally and therefore increasing to the next value means adding one to the current value.

This process is repeated for each pole. When the first pole is encountered again, the same determination will be made. If the longer duration for that pole still is not sufficient, and the back EMF detection is still at least partly outside the suppression interval, the value is increased again. Eventually, all poles will be passed without needing to increase the duration of any of the suppression intervals, although multiple passes may be necessary as the suppression duration for any given pole may need to be increased several times before it is long enough. In a preferred embodiment, the duration is stored as a three-bit number, meaning as many as eight passes may be required (in a case where at least one pole requires maximum duration). If the maximum duration—e.g., 50 μs in the three-bit example—is not sufficient, then an error (e.g., a speed fault) may be indicated.

Because the deviation of a particular pole from its nominal position may be in either direction, preferably when the suppression duration is increased, it is increased not by simply delaying the end of the suppression duration, but by both delaying the end of the suppression duration and advancing the beginning of the suppression duration. Preferably the delay of the end of the suppression duration and the advance of the beginning of the suppression duration are substantially the same, so that the elongated suppression duration preferably remains centered in time about the original suppression duration. However, it may be that the delay of the end of the suppression duration and the advance of the beginning of the suppression duration are different.

Alternatively, the invention could be implemented with only one endpoint of the suppression duration being moved in time. In such an implementation, during calibration, if back EMF is detected outside the suppression duration, meaning that the suppression duration should be increased, it would be noted whether the back EMF was detected before or after the suppression duration, in which case the beginning of the suppression duration would be advanced, or the end of the suppression duration would be delayed, respectively. In such a case, and additional bit may be required to indicate the direction of elongation of the suppression duration.

Therefore, in accordance with the present invention, there is provided, for use with an electric motor of a type having a plurality of poles each in a respective nominal position, wherein (a) one of the poles is designated as a reference pole, (b) the motor operates on a multiphase power supply, (c) motor speed control is based on detection of back EMF associated with each of the poles to determine motor position, and (d) one phase of the multiphase power supply is suppressed by setting of a control signal to a first state during detection of back EMF for each pole, a method for calibrating the motor to account for deviations of any of the poles from its respective nominal position. The method includes determining and storing a respective default value for duration of setting of the control signal to the first state for each respective pole, and activating the motor. After the motor has been activated, for each one of the poles:

1. The back EMF is detected;
2. It is decided whether the back EMF occurred while the control signal was set to a second state different from the first state;
3. On a decision that the back EMF occurred while the control signal was set to the second state, the value for duration of setting of the control signal to the first state for that one of the poles is increased; and
4. The adjusted value for duration of setting of the control signal to the first state is stored in place of any previously stored value.

The detecting, the deciding, the adjusting on deciding, and the storing, are repeated, as necessary, until for each said pole, the back EMF occurs while the control signal is in the first state.

A method for controlling a motor, and motor control apparatus, using the aforementioned calibration method, are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-5.

Figure 1:
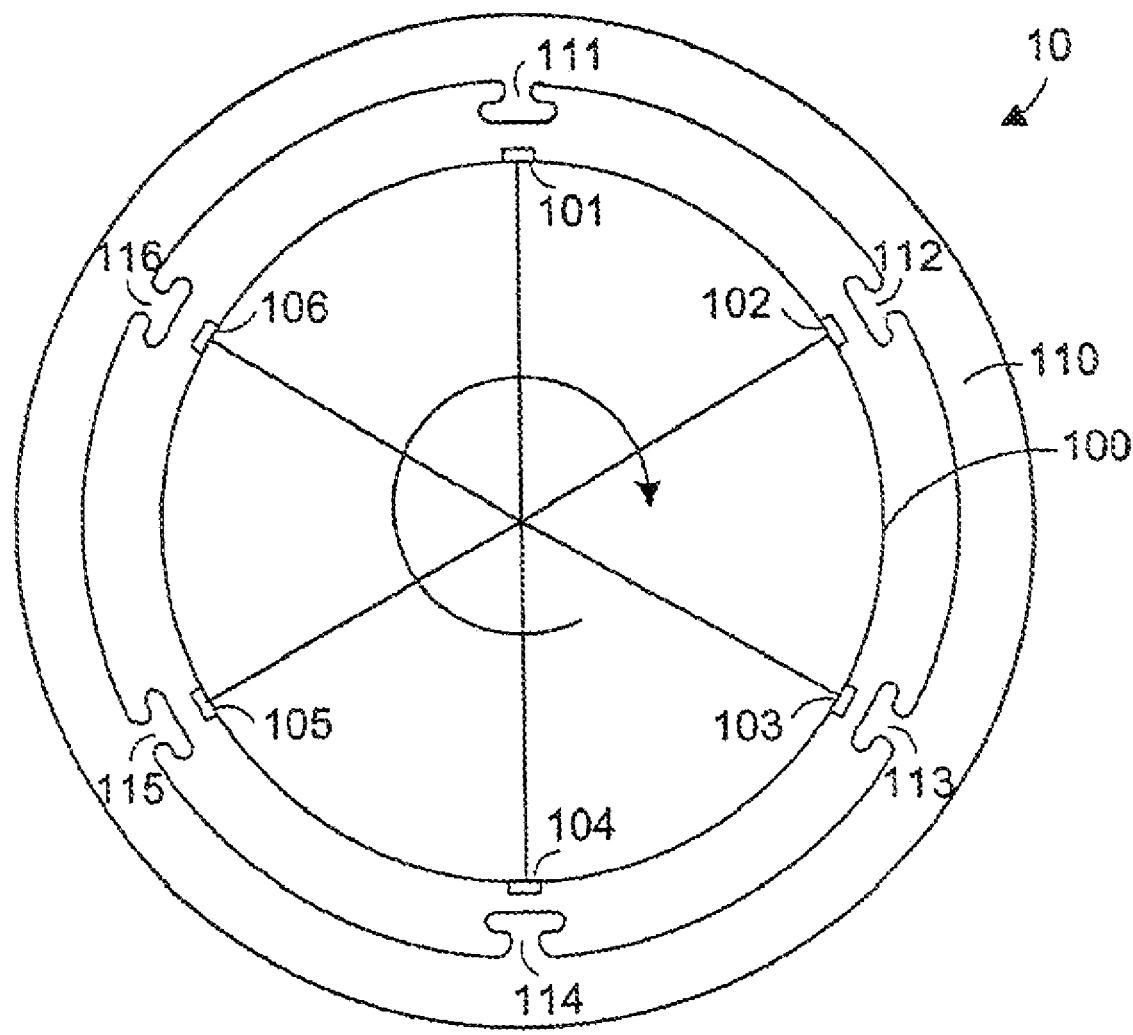
FIG. 1 is a diagrammatic view of theoretical pole placement in a motor, looking along the rotational axis of its rotor.
Figure 2:
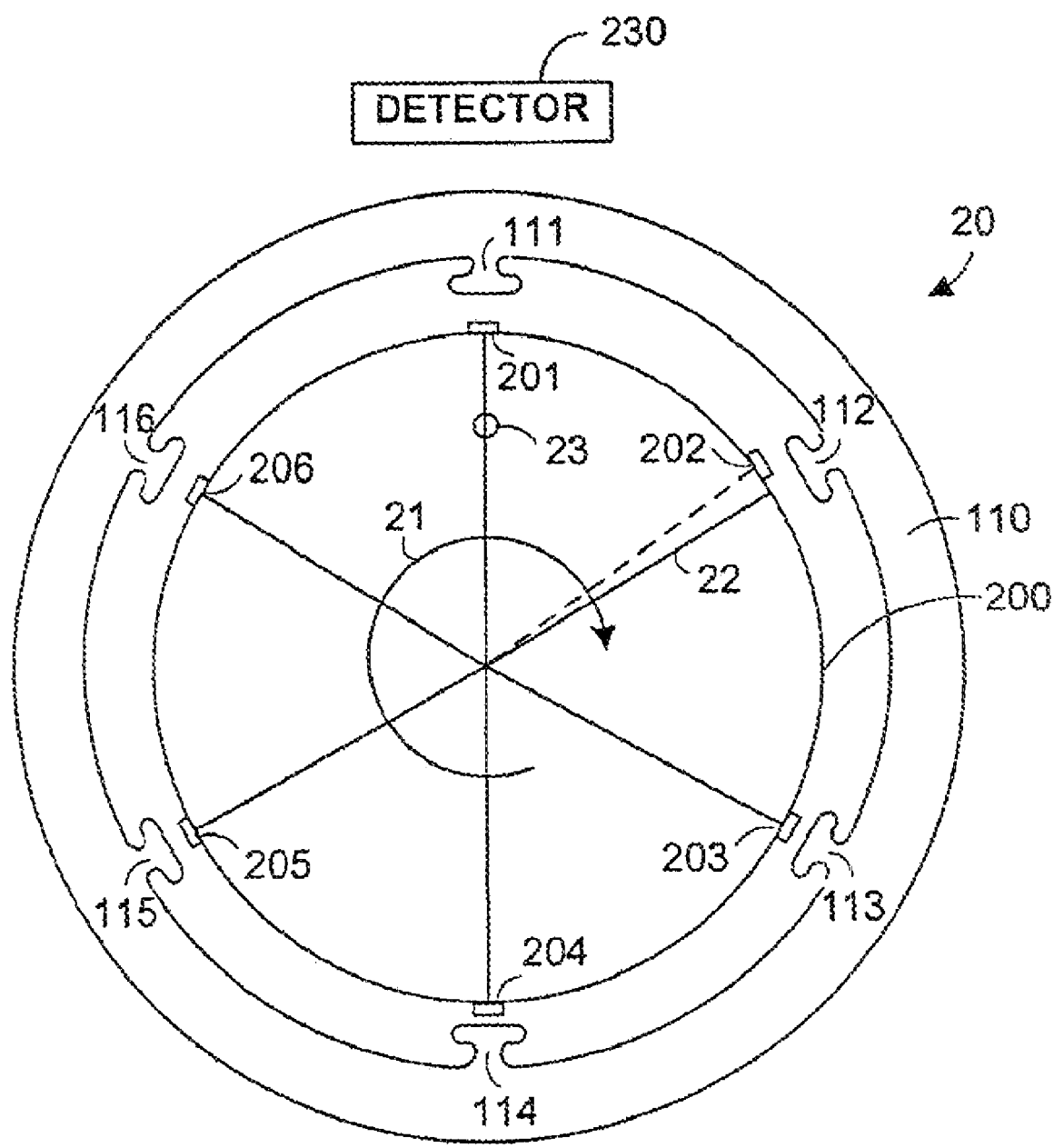
FIG. 2 is a view similar to FIG. 1 with one pole misaligned.

FIG. 1 shows, diagrammatically, the theoretical pole placement in a motor 10 with which the present invention is used. Although the view of FIG. 1 is theoretical, it may be considered as the view of a portion of a rotor 100, which could be the platter of a disk drive (in either a plan view or a cross-sectional view) taken perpendicular to the rotational axis, or a cross-sectional view of the motor shaft taken perpendicular to the rotational axis. The motor stator 110 is also shown. As seen in FIG. 1, rotor 100 preferably includes six poles 101-106, and stator 110 preferably includes six poles 111-116 to complement poles 101-106.

As discussed above, rotor poles 101-106 preferably are equiangularly distributed, as are stator poles 111-116. On each electrical cycle of the supply voltage, each rotor pole 101-106 advances to the next stator pole 111-116. As a rotor pole passes a stator pole, back EMF is generated and the occurrence of that back EMF can be used as an indication that a rotor pole has reached a stator pole, thereby serving as an indicator of rotor position (and therefore speed). If rotor poles 101-106 are in their ideal positions, 60° apart, the position (and speed) of rotor 100 can be accurately determined. It should be noted that because on each cycle every rotor pole approaches some stator pole, for position and speed detection, the approach of the rotor poles to one particular stator pole—e.g., stator pole 112—is used for position and speed detection.

However, also as discussed above, manufacturing conditions may result in one or more of rotor poles 101-106 being slightly displaced from their ideal positions. If those displacements were not accounted for, the rotor position determinations based on detection of back EMF would be inaccurate. One example is shown in motor 20 of FIG. 2 where rotor 200 has six rotor poles 201-206, with pole 202 somewhat closer to pole 201 than 60° and correspondingly somewhat further from pole 203 than 60°. It is apparent that, with rotation in the direction of arrow 21, without calibration, when the back EMF indicating the interaction of rotor pole 202 with stator pole 112 occurs, rotor 200 would be expected to be in the position shown in FIG. 2, with radial line 22, which is equiangularly spaced between rotor poles 201 and 203, lined up with stator pole 112, when in fact rotor 200 would be rotated further in the direction of arrow 21 so that rotor pole 202 is lined up with stator pole 112.

Figure 4:
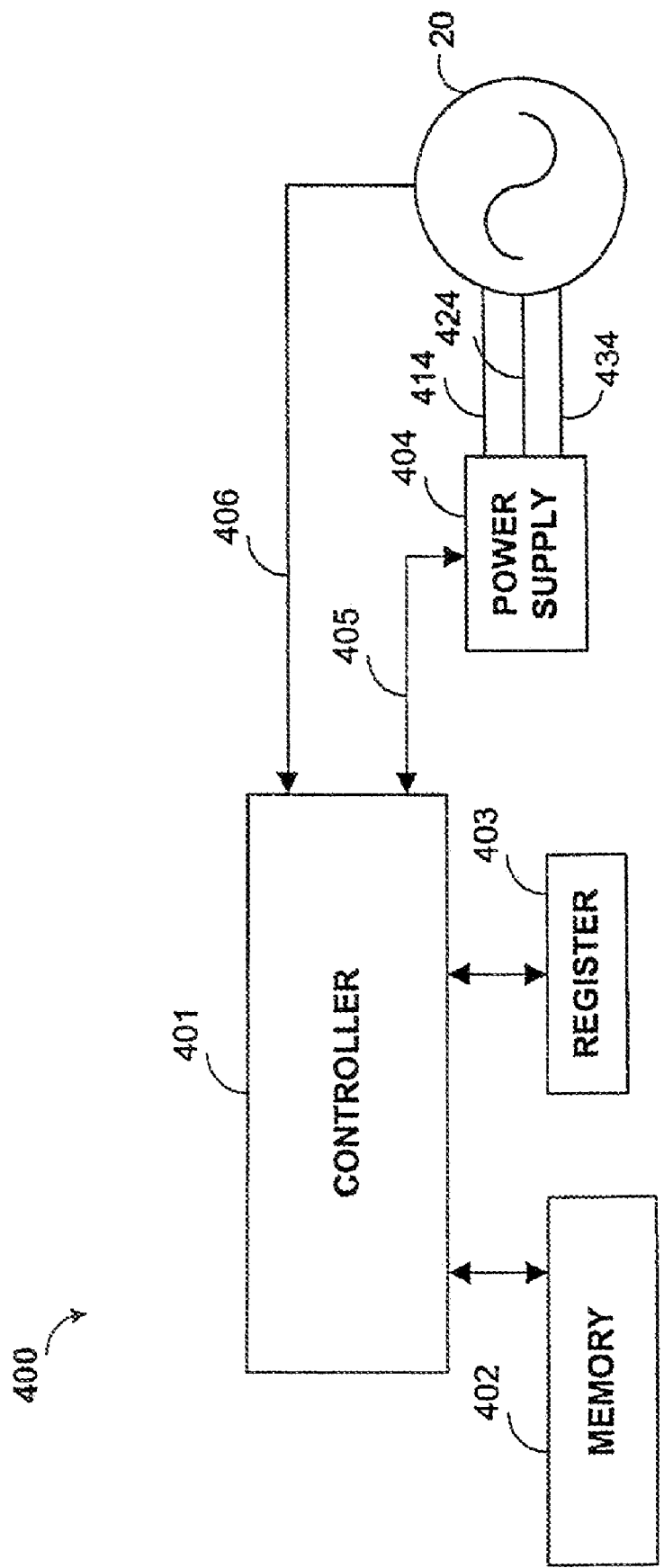
FIG. 4 is a schematic diagram of motor calibration and control circuitry in accordance with the present invention.

This discrepancy could be accounted for by calibrating the motor to account for actual rotor pole positions, which can be measured after manufacturing and stored in a memory 402 accessible to motor controller 401 (FIG. 4). A marker 23, which may be an optical or magnetic mark, or any other suitably detectable mark, can be placed on rotor 200 adjacent rotor pole 201 as a reference. Controller 401 preferably can count cycles from the detection of that marker—e.g., by a suitable optical or inductive detector 230, identify the current pole whose back EMF is being detected, look up the calibrated position in memory 402, and adjust accordingly its determination of rotor position and speed.

Even with such calibration, the determination of rotor position (and therefore speed) may not be accurate if the back EMF is not detected accurately. In the case of a disk drive motor, for example, the motor supply voltage may be a pulse-width modulated three-phase pulsed signal and the back EMF may occur on one of the three phases. In order to accurately detect the back EMF on that phase, that phase must be tristated. If pulses are allowed to continue on the other two phases, the back EMF to be measured may be affected. Therefore, ideally, one of the other two phases is pulled high, and another of the other two phases is pulled low, while the phase whose back EMF is to be measured is tristated.

Because the freeze period preferably is initiated by the completion of an electrical cycle (based on the aforementioned correspondence of one electrical cycle to the ideal pole-to-pole interval), the freeze period must be long enough to detect back EMF that occurs at other than the ideal interval. However, during the "freeze" period, current in whichever of the other two phases is high will charge up, so it is desired to keep the freeze period as short as possible.

The present invention allows the freeze period for each pole to be calibrated in accordance with its position, so that the freeze period for each pole is long enough for accurate back EMF detection, but no longer than necessary, and without requiring elongation of the freeze period for other poles if they are not misaligned.

Figure 3:
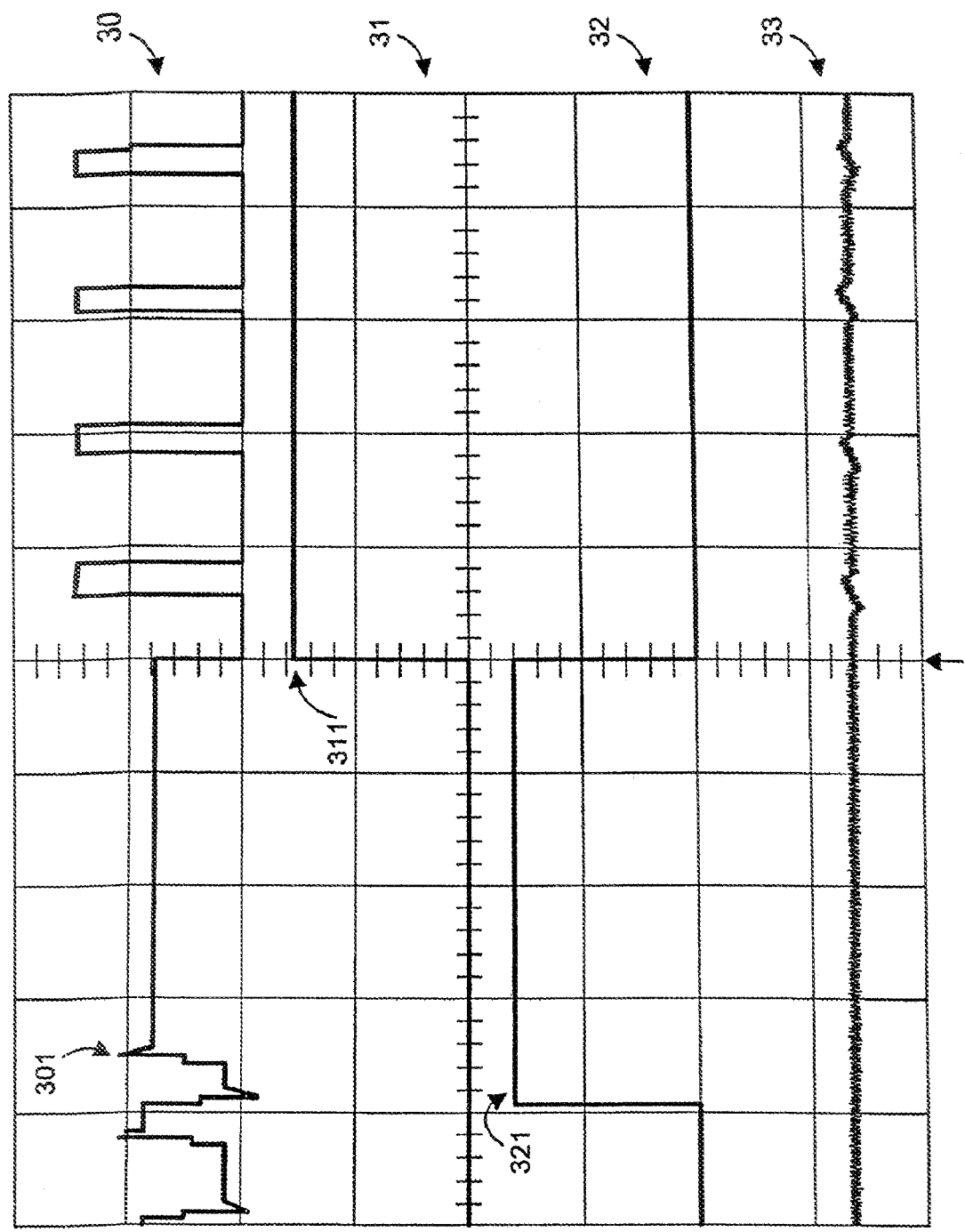
FIG. 3 is a graphical representation of a number of signals in accordance with the present invention.

FIG. 3 illustrates four waveforms associated with the detection of back EMF on a phase other than phase A of the three-phase voltage. Waveform 30 is the pulsed voltage on phase A, which is pulled high at 301 as the state of $T_{freeze}$ signal 32 is changed at 321 ahead of the detection at 311 of back EMF signal 31. As seen in waveform 30, after the freeze period is over, the phase A signal is altered as compared to before the freeze period, and the current 33 in phase A is increased.

Therefore, the default duration of the $T_{freeze}$ signal is kept at a minimum, but may be increased as needed in accordance with the present invention. As described above, at the time of calibration, which need occur only once, the motor is activated and the $T_{freeze}$ signal is applied at each electrical cycle as the back EMF of the then-current pole-pair interaction is detected, with the poles being identified by counting cycles after detection of reference mark 23. The back EMF waveform is compared to the $T_{freeze}$ signal to determine if any part of the back EMF waveform is outside the duration of the $T_{freeze}$ signal. If so, the $T_{freeze}$ signal duration for that pole is incremented by one and preferably stored in a table in memory 402. This is carried out at least once for each pole, preferably on one rotation of rotor 20. On a subsequent rotation the back EMF is detected again to see if it still occurs outside the elongated $T_{freeze}$ signal duration. If so, the $T_{freeze}$ signal duration is incremented again for that pole. This continues until there has been a complete revolution without having to further increment any $T_{freeze}$ signal, meaning that back EMF for each pole is occurring within its respective $T_{freeze}$ signal duration, or until one or more $T_{freeze}$ signals has been incremented to its maximum value. In a preferred embodiment, the $T_{freeze}$ signal duration is stored as a three-bit number, meaning that as few as one rotation is needed for calibration (if all back EMF signals are detected within the default $T_{freeze}$ signal durations) to as many as eight rotations if any $T_{freeze}$ signal duration must be incremented to it maximum value (seven increments and one further test rotation). As stated above, if the maximum $T_{freeze}$ duration (e.g., 50 μs in the three-bit case) is insufficient, an error condition, such as a speed fault, may be indicated. An example of the stored $T_{freeze}$ signal durations for a hypothetical motor is in the table below:

| Cycle | $T_{freeze}$ value |
|---|---|
| 1 | 010 |
| 2 | 010 |
| 3 | 011 |
| 4 | 100 |
| 5 | 011 |
| 6 | 010 |

An example of a motor drive, control and calibration circuit 400 in accordance with the invention is shown in FIG. 4. Circuit 400 preferably includes a controller 401, memory 402, a register 403 (which, although shown separately, may be part of memory 402), and a multiphase (e.g., three-phase) power supply 404. At least a portion of memory 402 may be of the counter type, such that stored values can be incremented by applying an appropriate control signal.

In a three-phase embodiment, power supply 404 provides power to motor 20 in three phases 414, 424, 434. Bidirectional connection 405 preferably allows controller 401 to monitor the cycles of power supply 404 to determine when to monitor the poles of motor 20 (via connection 406) for the occurrence of back EMF. At such times, controller 401 preferably would use connection 405 to set a $T_{freeze}$ signal to a state that suppresses the appropriate one of phases 414, 424, 434. While the time of setting of the $T_{freeze}$ signal to that state preferably is determined by the electrical cycles of power supply 404 as described above, the duration of each $T_{freeze}$ signal is determined by values determined during calibration as described above and as stored in memory 402.

Preferably, in advance of each cycle, the appropriate value is read from the table (similar to the table above) stored in memory 402 into register 403 so as to be readily available to controller 401 when the time to change the state of the $T_{freeze}$ signal approaches. Indeed, if, as is preferred, the duration of the $T_{freeze}$ signal is increased by advancing the beginning of the duration as well as by retarding the ending of the duration, the duration value would have to be available ahead of time to allow calculation of how early to change the state of the $T_{freeze}$ signal. Preferably, this is accomplished by reading the next value from the table stored in memory 402 into register 403 promptly at or just after the end of each cycle, so that it is available before the beginning of the next cycle.

During assertion of the $T_{freeze}$ signal, controller 401 preferably detects the back EMF and uses detection of the back EMF to determine motor position, and therefore speed, in the manner described above. Preferably this includes the use of an additional table stored in memory 402, containing data on the actual positions of rotor poles 101-106, as measured and stored after manufacture.

Figure 5:
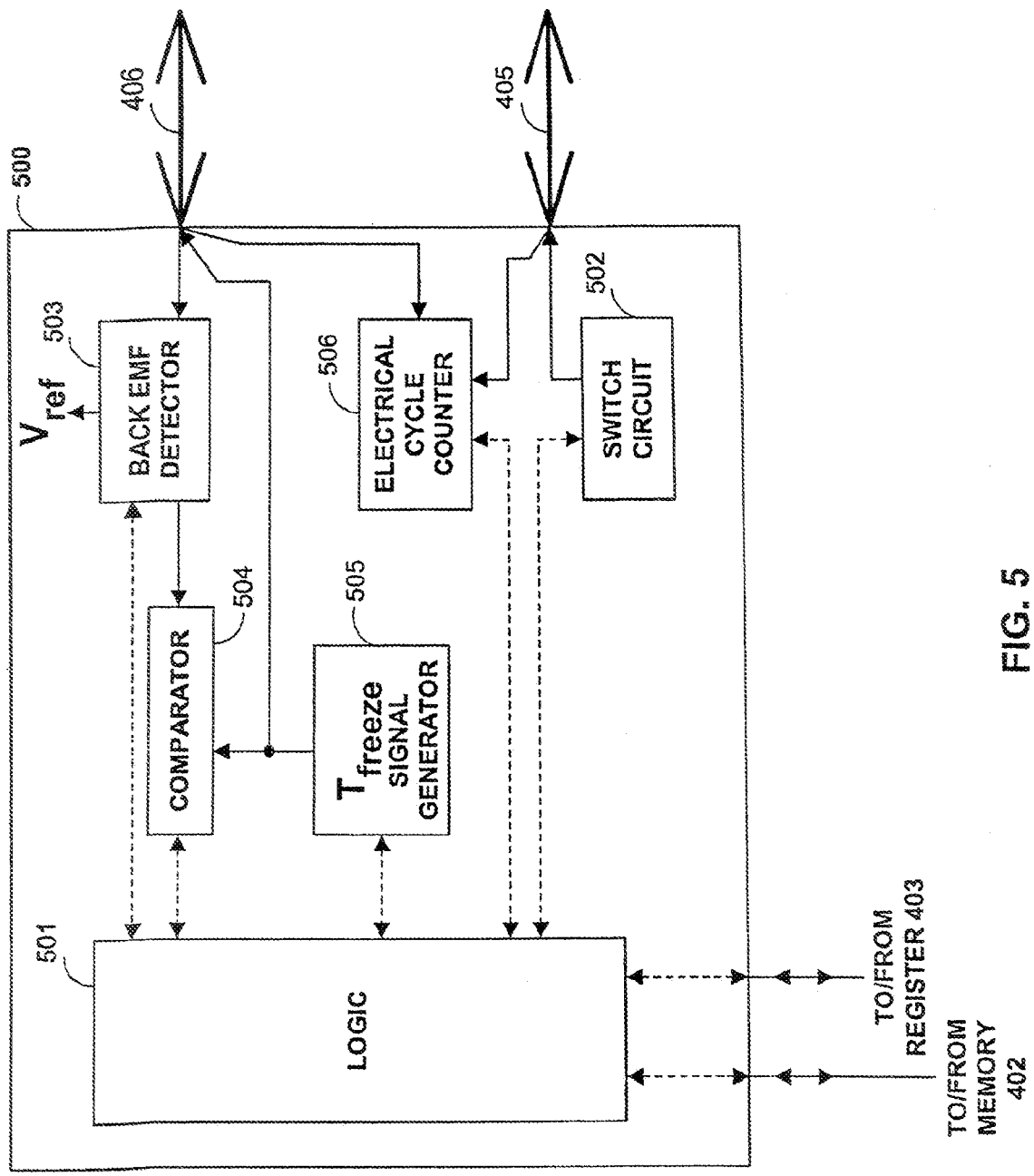
FIG. 5 is a schematic diagram showing detail of one embodiment of a controller shown in FIG. 4.

FIG. 5 shows details of one embodiment 500 of controller 401. Controller 500 may include logic 501, which could be a hard-wired logic, firmware or a programmed microcontroller or microprocessor. Switch circuit 502, which could be a simple transistor or could be more complex, controls power supply 404 via connection 405. Back EMF detector 503 may be a comparator that compares a signal on connection 406 to a predetermined reference $V_{ref}$. In one embodiment, the output of detector 503 may be input to another comparator 504, whose second input is the $T_{freeze}$ signal, so that in that embodiment when back EMF is detected and the $T_{freeze}$ signal is not being applied, the output of comparator 504 will be high, signalling that the stored duration in counter memory 402 needs to be increased. That comparator output is applied to counter memory 402 to increment the stored value for the current pole. The $T_{freeze}$ signal itself may be generated by signal generator 505. Finally, electrical cycle counter 506 counts cycles of power supply 404 as communicated via connection 405 and also receives, via connection 406, the output of detector 230 that is paired with reference mark 23, to determine the number of cycles since the passage of the reference mark, and therefore to identify the current pole.

Thus it is seen that a method and apparatus for more accurately controlling the speed of a motor, particularly in a disk drive, notwithstanding inaccurate pole placement, has been provided. It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for calibrating a motor to account for deviations of a pole of said motor from its respective nominal position, said method comprising:
storing, for each respective pole, a respective value representing how long a control signal is set to a first state; and
for each one of said poles:
detecting back EMF,
deciding whether said back EMF occurred while said control signal was set to a second state different from said first state,
on deciding that said back EMF occurred while said control signal was set to said second state, adjusting said value representing how long said control signal is set to said first state for said one of said poles, and
storing said adjusted value representing how long said control signal is set to said first state in association with said motor in place of a previously stored value.

2. The method of claim 1 further comprising repeating said detecting, said deciding, said adjusting on deciding, and said storing said adjusted value, until for each said pole, said back EMF occurs while said control signal is set to said first state.

3. The method of claim 1 wherein said adjusting on deciding comprises increasing said value.

4. The method of claim 3 wherein said respective value is a minimum possible value.

5. The method of claim 1 wherein said adjusting on deciding comprises decreasing said value.

6. The method of claim 1, further comprising:
designating one of said poles as a reference pole; and
identifying each said pole based on position relative to said reference pole.

7. The method of claim 6 wherein:
said motor operates on a power supply and advances from one said pole to an adjacent said pole during one electrical cycle of said power supply; and
said identifying comprises:
detecting said reference pole, and
counting electrical cycles after detecting said reference pole.

8. A method for controlling a motor; said method comprising:
calibrating said motor to account for deviations of a pole of said motor from its respective nominal position, said calibrating comprising:
storing a respective value representing how long a control signal is set to a first state for each respective pole, and
for each one of said poles:
(1) detecting back EMF,
(2) deciding whether said back EMF occurred while said control signal was set to a second state different from said first state,
(3) on deciding that said back EMF occurred while said control signal was set to said second state, adjusting said value representing how long said control signal is set to said first state for said one of said poles, and
(4) storing said adjusted value representing how long said control signal is set to said first state in association with said motor in place of a previously stored value; and
after said calibrating, controlling said motor by:
identifying an approaching one of said poles,
retrieving a stored value representing how long said control signal is set to said first state for said approaching one of said poles,
setting said control signal to said first state for a duration indicated by said retrieved value, to suppress one phase of a multiphase power supply of said motor,
detecting said back EMF associated with said approaching one of said poles to determine position of said motor, and
using said determined position to adjust motor speed.

9. The method of claim 8 wherein said calibrating further comprises repeating said detecting, said deciding, said adjusting on deciding, and said storing said adjusted value, until for each said pole, said back EMF occurs while said control signal is set to said first state.

10. The method of claim 8 wherein said adjusting on deciding comprises increasing said value.

11. The method of claim 10 wherein said respective value is a minimum possible value.

12. The method of claim 8 wherein said adjusting on deciding comprises decreasing said value.

13. The method of claim 8 wherein said controlling further comprises, to determine said position of said motor, using also said value representing how long said control signal is set to said first state for said approaching one of said poles.

14. The method of claim 8, wherein said calibrating further comprises:
designating one of said poles as a reference pole; and
storing a respective value representing how long said control signal is set to a first state for each respective pole.

15. The method of claim 14 wherein said identifying during said calibrating comprises:
detecting said reference pole, and
counting electrical cycles of said power supply after detecting said reference pole.

16. Apparatus for calibrating a motor to account for deviations of a pole of said motor from its respective nominal position, said apparatus comprising:
means for storing a respective value representing how long a control signal is set to a first state for each respective pole; and
means for, for each one of said poles:
detecting back EMF,
deciding whether said back EMF occurred while said control signal was set to a second state different from said first state,
on deciding that said back EMF occurred while said control signal was set to said second state, adjusting said value representing how long said control signal is set to said first state for said one of said poles, and
storing said adjusted value representing how long said control signal is set to said first state in association with said motor in place of a previously stored value.

17. The apparatus of claim 16 further comprising means for repeating said detecting, said deciding, said adjusting on deciding, and said storing said adjusted value, until for each said pole, said back EMF occurs while said control signal is set to said first state.

18. The apparatus of claim 16 wherein said means for detecting, deciding, adjusting on deciding and storing adjusts said value by increasing said value.

19. The apparatus of claim 18 wherein said respective value is a minimum possible value.

20. The apparatus of claim 16 wherein said means for detecting, deciding, adjusting on deciding and storing adjusts said value by decreasing said value.

21. The apparatus of claim 16 wherein:
one of said poles is designated as a reference pole; said apparatus further comprising:
means for identifying each said pole based on position relative to said reference pole.

22. The apparatus of claim 21 wherein:
said motor operates on a power supply and advances from one said pole to an adjacent said pole during one electrical cycle of said power supply; and
said means for identifying comprises:
means for detecting said reference pole, and
means for counting electrical cycles after detecting said reference pole.

23. Apparatus for controlling a motor, said apparatus comprising:
means for calibrating said motor to account for deviations of a pole of said motor from its respective nominal position, said means for calibrating comprising:
means for determining and storing a respective value, associated with each respective pole, representing how long a control signal is set to a first state for said respective pole, and
means for, at each one of said poles:
(1) detecting back EMF,
(2) deciding whether said back EMF occurred while said control signal was set to a second state different from said first state,
(3) on deciding that said back EMF occurred while said control signal was set to said second state, adjusting said value representing how long said control signal is set to said first state for said one of said poles, and
(4) storing said adjusted value representing how long said control signal is set to said first state in association with said motor in place of a previously stored value; and
means for, after said calibration, controlling said motor by:
identifying an approaching one of said poles,
retrieving a stored value representing how long said control signal is set to said first state for said approaching one of said poles,
setting said control signal to said first state for a duration indicated by said retrieved value, to suppress one phase of a multiphase power supply of said motor,
detecting said back EMF associated with said approaching one of said poles to determine position of said motor, and
using said determined position to adjust motor speed.

24. The apparatus of claim 23 further comprising means for repeating said detecting, said deciding, said adjusting on deciding, and said storing said adjusted value, until for each said pole, said back EMF occurs while said control signal is set to said first state.

25. The apparatus of claim 23 wherein said means for detecting, deciding, adjusting on deciding and storing adjusts said value by increasing said value.

26. The apparatus of claim 25 wherein said respective value is a minimum possible value.

27. The apparatus of claim 23 wherein said means for detecting, deciding, adjusting on deciding and storing adjusts said value by decreasing said value.

28. The apparatus of claim 23 wherein said means for controlling also uses said value representing how long said control signal is set to said first state for said approaching one of said poles.

29. The apparatus of claim 23 wherein:
one of said poles is designated as a reference pole; said apparatus further comprising:
means for identifying each said pole based on position relative to said reference pole.

30. The apparatus of claim 29 wherein said means for identifying comprises:
means for detecting said reference pole, and
means for counting electrical cycles after detecting said reference pole.

31. Apparatus for calibrating a motor to account for deviations of a pole of said motor from its respective nominal position, said apparatus comprising:
memory for storing a respective value representing how long a control signal is set to a first state for each respective pole; and
a controller that, for each one of said poles:
detects back EMF,
decides whether said back EMF occurred while said control signal was set to a second state different from said first state,
on deciding that said back EMF occurred while said control signal was set to said second state, adjusts said value representing how long said control signal is set to said first state for said one of said poles, and
stores said adjusted value representing how long said control signal is set to said first state in association with said motor in place of a previously stored value.

32. The apparatus of claim 31 further comprising a sequencer that repeats said detecting, said deciding, said adjusting on deciding, and said storing said adjusted value, until for each said pole, said back EMF occurs while said control signal is set to said first state.

33. The apparatus of claim 31 wherein said controller adjusts said value by increasing said value.

34. The apparatus of claim 33 wherein said respective value is a minimum possible value.

35. The apparatus of claim 31 wherein said controller adjusts said value by decreasing said value.

36. The apparatus of claim 31 wherein:
one of said poles is designated as a reference pole; said apparatus further comprising:
a pole identifier that identifies each said pole based on position relative to said reference pole.

37. The apparatus of claim 36 wherein:
said motor operates on a power supply and advances from one said pole to an adjacent said pole during one electrical cycle of said power supply; and
said pole identifier comprises:
a detector to detect said reference pole, and
a counter to count electrical cycles after detecting said reference pole.

38. Apparatus for controlling a motor, said apparatus comprising:
calibration circuitry to calibrate said motor to account for deviations of a pole of said motor from its respective nominal position, said calibration circuitry comprising:
memory for storing a respective value representing how long a control signal is set to a first state for each respective pole; and
a controller that, for each one of said poles:
(1) detects back EMF,
(2) decides whether said back EMF occurred while said control signal was set to a second state different from said first state,
(3) on deciding that said back EMF occurred while said control signal was set to said second state, adjusts said value representing how long said control signal is set to said first state for said one of said poles, and (4) stores said adjusted value representing how long said control signal is set to said first state in association with said motor in place of a previously stored value; and controlling circuitry operating after said calibration, and comprising:

a pole identifier to identify an approaching one of said poles, memory access circuitry to retrieve a stored value representing how long said control signal is set to said first state for said approaching one of said poles, a control signal circuit to set said control signal to said first state for a duration indicated by said retrieved value, a phase suppressor to suppress one phase of a multiphase power supply of said motor, a detector to detect said back EMF associated with said approaching one of said poles to determine position of said motor, and logic that uses said determined position to adjust motor speed.

39. The apparatus of claim 38 further comprising a sequencer for repeating said detecting, said deciding, said adjusting on deciding, and said storing said adjusted value, until for each said pole, said back EMF occurs while said control signal is set to said first state.

40. The apparatus of claim 38 wherein said controller adjusts said value by increasing said value.

41. The apparatus of claim 40 wherein said respective value is a minimum possible value.

42. The apparatus of claim 38 wherein said controller adjusts said value by decreasing said value.

43. The apparatus of claim 38 wherein said controlling circuitry also uses said value representing how long said control signal is set to said first state for said approaching one of said poles.

44. The apparatus of claim 38 wherein:

one of said poles is designated as a reference pole; said apparatus further comprising:

a pole identifier to identify each said pole based on position relative to said reference pole.

45. The apparatus of claim 44 wherein said pole identifier comprises:

a detector to detect said reference pole, and a counter to count electrical cycles after detecting said reference pole.

* * * * *